(12) United States Patent
Engelhardt et al.

(10) Patent No.: US 6,414,214 B1
(45) Date of Patent: Jul. 2, 2002

(54) MECHANICALLY STABLE HYDROGEL-FORMING POLYMERS

(75) Inventors: Friedrich Engelhardt, Frankfurt; Volker Frenz, Mainz-Kostheim; Norbert Herfert, Altenstadt; Ulrich Riegel, Frankfurt; Matthias Weismantel, Jossgrund; Wilfried Heide, Freinsheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/411,644

(22) Filed: Oct. 4, 1999

(51) Int. Cl.$^7$ .................................................. A61F 13/15
(52) U.S. Cl. ........................ 604/368; 604/367; 604/372
(58) Field of Search ................................ 523/206, 201, 523/105; 524/916; 526/930; 424/402, 484, 486, 487; 604/365, 368, 374, 375, 372, 367; 428/327, 290, 339

(56) References Cited

U.S. PATENT DOCUMENTS

| | | | |
|---|---|---|---|
| 4,654,039 A | * | 3/1987 | Brandt et al. ............... 604/368 |
| 4,834,735 A | * | 5/1989 | Alemany .................... 604/368 |
| 5,147,345 A | * | 9/1992 | Young et al. ............... 604/368 |
| 5,149,335 A | | 9/1992 | Kellenberger et al. |
| 5,339,019 A | * | 7/1996 | Suskind et al. ............. 525/368 |
| 5,562,646 A | | 10/1996 | Goldman et al. |
| 5,599,335 A | | 2/1997 | Goldman et al. |
| 5,669,894 A | * | 9/1997 | Goldman et al. ........... 604/368 |
| 5,731,365 A | | 3/1998 | Engelhardt et al. |
| 5,840,321 A | | 11/1998 | Engelhardt et al. |
| 5,849,816 A | * | 12/1998 | Suskind et al. ............. 525/340 |
| 6,121,509 A | * | 9/2000 | Ashraf et al. ............... 523/201 |

FOREIGN PATENT DOCUMENTS

| | | | |
|---|---|---|---|
| EP | 0 532 002 | 3/1993 | |
| EP | 0 615 736 | 9/1994 | |
| EP | 0 690 077 | 1/1996 | |
| EP | 0690 077 A1 | * 1/1996 | ........... C08F/20/04 |
| EP | 0 761 191 | 3/1997 | |
| EP | 0761191 A2 | * 12/1997 | ........... A61F/13/16 |
| WO | WO 94/22940 | 10/1994 | |

* cited by examiner

Primary Examiner—John G. Weiss
Assistant Examiner—Jacqueline F. Stephens
(74) Attorney, Agent, or Firm—Oblon, Spivak, McClelland, Maier & Neustadt, P.C.

(57) ABSTRACT

Hydrogel-forming polymers which have:
(i) a Saline Flow Conductivity of at least $40 \times 10^{-7}$ cm$^3$s/g;
(ii) an AUL 0.7 psi (4826.5 Pa) of at least 20 g/g; and
(iii) a Frangibility Index of at least 60%,
are useful in hygienic articles such as incontinence briefs for adults and diapers for infants.

29 Claims, No Drawings

MECHANICALLY STABLE HYDROGEL-FORMING POLYMERS

BACKGROUND OF THE INVENTION

Field of the Invention

The present invention relates to hydrogel-forming polymers of improved mechanical stability which have an AUL 0.7 psi of at least 20 g/g, a Saline Flow Conductivity of at least $40 \times 10^{-7}$ cm$^3$s/g and a Frangibility Index of at least 60%, their production and the use of these polymers for absorbing aqueous fluids, especially body fluids in hygiene articles for adults and infants.

DISCUSSION OF THE BACKGROUND

Hydrogel-forming polymers have high absorption capacity for water and aqueous solutions and are therefore the preferred superabsorbent polymers for use as absorbents in hygiene articles.

SUMMARY OF THE INVENTION

The increasing tendency to make hygiene articles such as diapers ever smaller and thinner while preserving the same total absorption capacity is contingent on the ability to reduce the proportion of bulky wood pulp fluff and to raise the proportion of highly swellable hydrogel. As a consequence, the superabsorbent polymers have to perform additional functions with regard to liquid acquisition, transportation and distribution which were previously performed by the wood pulp fluff in order that any leakage from the hygiene article due to the phenomenon known as gel blocking may be prevented.

Examples of hygiene articles containing a major fraction of highly swellable hydrogel are taught in U.S. Pat. No. 5,149,335, EP-A-532 002, EP-A-615 736, EP-A-761 191 and U.S. Pat. No. 5,562,646. However, the products have unsatisfactory properties with regard to fluid transportation in the swollen state.

U.S. Pat. No. 5,599,335 and U.S. Pat. No. 5,669,894 describe an absorbent composition comprising at least one region comprising a superabsorbent polymer in a concentration of 60–100% by weight, the superabsorbent polymer having a Saline Flow Conductivity value of at least $30 \times 10^{-7}$ cm$^3$sec/g and a Performance Under Pressure value of at least 23 g/g under a confining pressure of 0.7 psi (4826.5 Pa).

Hygiene articles having a high hydrogel content require hydrogels exhibiting good absorption capacity under load and adequate permeability in the swollen gel state. These properties are generally exhibited by hydrogel-forming polymers that are densely crosslinked.

However, dense crosslinking causes hydrogel-forming polymers to become very brittle, so that they are easily attrited or even fractured by the action of mechanical forces occurring for example in the course of pneumatic conveying, for example in the course of the manufacture of the hygiene article, in the unswollen state. Attrition due to mechanical stress gives rise, firstly, to dust fractions and, secondly, to a deterioration in the physico-chemical product properties. Fine dust less than 10 µm in particle size in undesirable for inhalation-toxic reasons. Fine dusts less than 100 µm in size are the cause of visually detectable dusting with all its consequences and lead to handling problems in the production and processing plant and are therefore likewise undesirable. An increased fines fraction also causes a deterioration in the absorption and fluid transmission properties, since the swollen fines particles plug the pores in the absorbent structure. In the case of surface-postcrosslinked hydrogel-forming polymers, furthermore, mechanical attrition destroys the more highly crosslinked surface layer of the polymer particle, causing the lightly crosslinked core to come to the surface, so that these particles exhibit gel blocking in the absorbent structure.

There have been various attempts to stabilize the densely crosslinked polymers to mechanical stresses through an additional coating.

For instance, EP-A-703 265 describes highly swellable hydrophilic hydrogels coated with nonreactive water-insoluble film-forming polymers and thus exhibiting improved attrition resistance. Preferred film-forming polymers are homo- or copolymers of vinyl esters and also homo- or copolymers of acrylic or methacrylic esters.

EP 755 964 teaches coating the hydrogels with nonreactive water-insoluble waxes for improved attrition resistance. Preferred waxes are montan waxes and polyethylene waxes or oxidates of polyethylene waxes.

The disadvantage of both the coatings is a hydrophobicization of the particle surface, which leads to a deterioration in fluid transmission in the hygiene article.

WO 94/22940 describes coating hydrogel-forming polymers with polyether polyols for dustproofing and improved attrition resistance. However, this coating may become dissolved off on contact with aqueous fluids and will then increase the viscosity of the fluid to be absorbed, reducing the amount of fluid absorbed by the absorbent composition.

EP-A-690 077 describes the polymerization of comonomers containing ether and hydroxyl groups, for example polyethylene glycol (meth)acrylates or polypropylene glycol (meth)acrylates, to improve the attrition resistance. To obtain the desired effect, however, relatively large fractions of these copolymers have to be used, even though they do not contribute to the osmotic swelling power of the hydrogels and are therefore responsible for a deterioration in the swelling capacity on a weight basis.

It is an object of the present invention to provide hydrogel-forming polymers which possess high mechanical stability, high absorption capacity under load and high permeability in the swollen state without the abovementioned disadvantages.

We have found that this object is achieved by hydrogel-forming polymers having an AUL 0.7 psi (4826.5 Pa) of at least 20 g/g, a Saline Flow Conductivity of at least $40 \times 10^{-7}$ cm$^3$s/g and a Frangibility Index of at least 60%. The present invention further provides a process for producing such hydrogel-forming polymers and for their use for absorbing aqueous fluids, especially body fluids in hygiene articles for adults and infants.

DETAILED DESCRIPTION OF THE PREFERRED EMBODIMENTS

The polymers of the invention are obtainable by adjusting a hydrogel-forming polymer having a Saline Flow Conductivity (SFC) of at least $40 \times 10^{-7}$ cm$^3$s/g and an AUL 0.7 psi (4826.5 Pa) of at least 20 g/g to a residual moisture content of at least 3% by weight, preferably 4% by weight, especially 5% by weight, based on the hydrogel-forming polymer.

As used herein, "residual moisture content" is the amount of moisture which takes 3 h to evaporate at 105° C. The residual moisture content is preferably water. The addition of small amounts, up to 20% by weight, of a water-miscible organic solvent in a mixture with water is possible, but generally does not provide a superior effect compared with pure water.

Polymers having an SFC $\geq 40 \times 10^{-7}$ cm$^3$s/g and an AUL 0.7 psi $\geq 20$ g/g are common knowledge and are described for example in U.S. Pat. No. 5,599,335 and U.S. Pat. No. 5,669,894. These polymers are surface-postcrosslinked hydrogels. The surface postcrosslinking is responsible for the high degree of crosslinking of the polymer and hence for the problems described at the beginning.

The base polymers which are subsequently surface-postcrosslinked are crosslinked polymers having acid groups which are predominantly present in the form of their salts, generally alkali metal or ammonium salts. Such polymers swell on contact with aqueous fluids to form gels.

Examples of such base polymers are graft (co)polymers of one or more hydrophilic monomers on a suitable grafting base, crosslinked cellulose or starch ethers and esters bearing acid groups, crosslinked carboxymethylcellulose or natural products capable of swelling in aqueous fluids and having acid groups, for example alginates and carrageenans.

Suitable grafting bases may be of natural or synthetic origin. Examples are starch, cellulose or cellulose derivatives and also other polysaccharides and oligosaccharides, polyvinyl alcohol, polyalkylene oxides, especially polyethylene oxides and polypropylene oxides, polyamines, polyamides and also hydrophilic polyesters. Suitable polyalkylene oxides conform for example to the formula

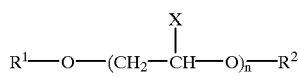

where $R^1$ and $R^2$ are independently hydrogen, alkyl, alkenyl or acryl,

X is hydrogen or methyl, and n is an integer from 1 to 10,000.

$R^1$ and $R^2$ are each preferably hydrogen, $C_1$–$C_4$-alkyl, $C_2$–$C_6$-alkenyl or phenyl.

Preference is given to polymers which are obtained by crosslinking polymerization or copolymerization of monoethylenically unsaturated monomers bearing acid groups, or of salts thereof. It is further possible to (co)polymerize these monomers without crosslinker and to crosslink subsequently.

Examples of such monomers bearing acid groups are monoethylenically unsaturated $C_3$- to $C_{25}$-carboxylic acids or anhydrides such as acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid and fumaric acid. It is also possible to use monoethylenically unsaturated sulfonic or phosphonic acids, for example vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, vinylphosphonic acid, allylphosphonic acid, styrenesulfonic acid and 2-acrylamido-2-methylpropanesulfonic acid. The monomers may be used alone or mixed.

Preferred monomers are acrylic acid, methacrylic acid, vinylsulfonic acid, acrylamidopropanesulfonic acid or mixtures thereof, for example mixtures of acrylic and methacrylic acid, mixtures of acrylic acid and acrylamidopropanesulfonic acid or mixtures of acrylic acid and vinylsulfonic acid.

To optimize properties, it can be sensible to use additional monoethylenically unsaturated compounds which do not bear an acid group but are copolymerizable with the monomers bearing acid groups. Such compounds include for example the amides and nitriles of monoethylenically unsaturated carboxylic acids, for example acrylamide, methacrylamide and N-vinylformamide, N-vinylacetamide, N-methyl-N-vinylacetamide, acrylonitrile and methacrylonitrile. Examples of further suitable compounds are vinyl esters of saturated $C_1$- to $C_4$-carboxylic acids such as vinyl formate, vinyl acetate or vinyl propionate, alkyl vinyl ethers having at least 2 carbon atoms in the alkyl group, for example ethyl vinyl ether or butyl vinyl ether, esters of monoethylenically unsaturated $C_3$- to $C_6$-carboxylic acids, for example esters of monohydric $C_1$- to $C_{18}$-alcohols and acrylic acid, methacrylic acid or maleic acid, monoesters of maleic acid, for example methyl hydrogen maleate, N-vinyllactams such as N-vinylpyrrolidone or N-vinylcaprolactam, acrylic and methacrylic esters of alkoxylated monohydric saturated alcohols, for example of alcohols having from 10 to 25 carbon atoms which have been reacted with from 2 to 200 mol of ethylene oxide and/or propylene oxide per mole of alcohol, and also monoacrylic esters and monomethacrylic esters of polyethylene glycol or polypropylene glycol, the molar masses ($M_n$) of the polyalkylene glycols being up to 2000, for example. Further suitable monomers are styrene and alkyl-substituted styrenes such as ethylstyrene or tert-butylstyrene.

These monomers without acid groups may also be used in mixture with other monomers, for example mixtures of vinyl acetate and 2-hydroxyethyl acrylate in any proportion. These monomers without acid groups are added to the reaction mixture in amounts within the range from 0 to 50% by weight, preferably less than 20% by weight.

Preference is given to crosslinked polymers of monoethylenically unsaturated monomers which bear acid groups and which are optionally converted into their alkali metal or ammonium salts before or after polymerization and 0–50% by weight, based on their total weight, of monoethylenically unsaturated monomers which do not bear acid groups.

Preference is given to crosslinked polymers of monoethylenically unsaturated $C_3$–$C_{12}$-carboxylic acids and/or their alkali metal or ammonium salts. Preference is given in particular to crosslinked polyacrylic acids, 25–100% of whose acid groups are present as alkali metal or ammonium salts.

Possible crosslinkers include compounds containing at least 2 ethylenically unsaturated double bonds. Examples of compounds of this type are N,N'-methylenebisacrylamide, polyethylene glycol diacrylates and polyethylene glycol dimethacrylates each derived from polyethylene glycols having a molecular weight of from 106 to 8500, preferably from 400 to 2000, trimethylolpropane triacrylate, trimethylolpropane trimethacrylate, ethylene glycol diacrylate, propylene glycol diacrylate, butanediol diacrylate, butanediol dimethacrylate, hexanediol diacrylate, hexanediol dimethacrylate, allyl methacrylate, diacrylates and dimethacrylates of block copolymers of ethylene oxide and propylene oxide, polyhydric alcohols, such as glycerol or pentaerythritol, doubly or more highly esterified with acrylic acid or methacrylic acid, triallylamine, dialkyldiallylammonium halides such as dimethyldiallylammonium chloride and diethyldiallylammonium chloride, tetraallylethylenediamine, divinylbenzene, diallyl phthalate, polyethylene glcyol divinyl ethers of polyethylene glycols having a molecular weight of from 106 to 4000, trimethylolpropane diallyl ether, butanediol divinyl ether, pentaerythritol triallyl ether, reaction products of 1 mol of ethylene glycol diglycidyl ether or polyethylene glycol diglycidyl ether with 2 mol of pentaerythritol triallyl ether or allyl alcohol, and/or divinylethyleneurea. Preference is given to using water-soluble crosslinkers, for example N,N'-methylenebisacrylamide, polyethylene glycol diacrylates and polyethylene glycol dimethacrylates derived from addition products of from 2 to 400 mol of ethylene oxide with 1 mol of a diol or polyol, vinyl esters of addition products of from 2 to 400 mol of ethylene oxide with 1 mol of a diol or polyol, ethylene glycol diacrylate, ethylene glycol dimethacrylate or triacrylates and trimethacrylates of addition products of from 6 to 20 mol of ethylene oxide with 1 mol of glycerol, and/or divinylurea.

Possible crosslinkers also include compounds containing at least one polymerizable ethylenically unsaturated group and at least one further functional group. The functional group of these crosslinkers has to be capable of reacting with the functional groups, essentially the acid groups, of the monomers. Suitable functional groups include for example hydroxyl, amino, epoxy and aziridino groups. Useful are for example hydroxyalkyl esters of the abvoementioned monoethylenically unsaturated carboxylic acids, e.g., 2-hydroxyethyl acrylate, hydroxypropyl acrylate, hydroxybutyl acrylate, hydroxyethyl methacrylate, hydroxypropyl methacrylate and hydroxybutyl methacrylate, allylpiperidinium bromide, N-vinylimidazoles, for example N-vinylimidazole, 1-vinyl-2-methylimidazole and N-vinylimidazolines such as N-vinylimidazoline, 1-vinyl-2-methylimidazoline, 1-vinyl-2-ethylimidazoline or 1-vinyl-2-propylimidazoline, which can be used in the form of the free bases, in quaternized form or as salt in the polymerization. It is also possible to use dialkylaminoalkyl acrylates and dialkylaminoalkyl methacrylates such as dimethylaminoethyl acrylate, dimethylaminoethyl methacrylate, diethylaminoethyl acrylate and diethylaminoethyl methacrylate. The basic esters are preferably used in quaternized form or as salt. It is also possible to use glycidyl (meth)acrylate, for example. Crosslinkers are present in the reaction mixture for example from 0.001 to 20%, preferably from 0.01 to 14%, by weight.

The polymerization is initiated in the generally customary manner, by means of an initiator. But the polymerization may also be initiated by electron beams acting on the polymerizable aqueous mixture. However, the polymerization may also be initiated in the absence of initiators of the abovementioned kind, by the action of high energy radiation in the presence of photoinitiators. Useful polymerization initiators include all compounds which decompose into free radicals under the polymerization conditions, for example peroxides, hydroperoxides, hydrogen peroxide, persulfates, azo compounds and redox catalysts. The use of water-soluble initiators is preferred. In some cases it is advantageous to use mixtures of different polymerization initiators, for example mixtures of hydrogen peroxide and sodium peroxodisulfate or potassium peroxodisulfate. Mixtures of hydrogen peroxide and sodium peroxodisulfate may be used in any proportion. Examples of suitable organic peroxides are acetylacetone peroxide, methyl ethyl ketone peroxide, tert-butyl hydroperoxide, cumene hydroperoxide, tert-amyl perpivalate, tert-butyl perpivalet, tert-butylperneohexanoate, tert-butyl perisobutyrate, tert-butyl per-2-ethylhexanoate, tert-butyl perisononanoate, tert-butyl permaleate, tert-butyl perbenzoate, di(2-ethylhexyl) peroxydicarbonate, dicyclohexyl peroxydicarbonate, di(4-tert-butylcyclohexyl) peroxydicarbonate, dimyristyl peroxydicarbonate, diacetyl peroxydicarbonate, allyl peresters, cumyl peroxyneodecanoate, tert-butyl per-3,5-trimethylhexanoate, acetyl cyclohexylsulfonyl peroxide, dilauryl peroxide, dibenzoyl peroxide and tert-amyl perneodecanoate. Particularly suitable polymerization initiators are water-soluble azo initiators, e.g., 2,2'-azobis(2-amidinopropane) dihydrochloride, 2,2'-azobis(N,N-dimethylene) isobutyramidine hydrochloride, 2-(carbamoylazo)isobutyronitrile, 2,2'-azobis[2-(2'-imidazolin-2-yl)propane] dihydrochloride and 4,4'-azobis(4-cyanovaleric acid). The polymerization initiators mentioned are used in customary amounts, for example in amounts of from 0.01 to 5%, preferably from 0.1 to 2.0%, by weight, based on the monomers to be polymerized.

Useful initiators also include redox catalysts. In redox catalysts, the oxidizing component is at least one of the above-specified per compounds and the reducing component is for example ascorbic acid, glucose, sorbose, ammonium or alkali metal bisulfite, sulfite, thiosulfate, hyposulfite, pyrosulfite or sulfide, or a metal salt, such as iron(II) ions or sodium hydroxymethylsulfoxylate. The reducing component in the redox catalyst is preferably ascorbic acid or sodium sulfite. Based on the amount of monomers used in the polymerization, from $3 \cdot 10^{-6}$ to 1 mol % may be used for the reducing component of the redox catalyst system and from 0.001 to 5.0 mol % for the oxidizing component of the redox catalyst, for example.

When the polymerization is initiated using high energy radiation, the initiator used is customarily a photoinitiator. Photoinitiators include for example α-splitters, H-abstracting systems or else azides. Examples of such initiators are benzophenone derivatives such as Michler's ketone, phenanthrene derivatives, fluorene derivatives, anthraquinone derivatives, thioxanthone derivatives, coumarin derivatives, benzoin ethers and derivatives thereof, azo compounds such as the abovementioned free-radical formers, substituted hexaarylbisimidazoles or acylphosphine oxides. Examples of azides are: 2-(N,N-dimethylamino)ethyl 4-azidocinnamate, 2-(N,N-dimethylamino)ethyl 4-azidonaphthyl ketone, 2-(N,N-dimethylamino)ethyl 4-azidobenzoate, 5-azido-1-naphthyl 2'-(N,N-dimethylamino)ethyl sulfone, N-(4-sulfonylazidophenyl)maleimide, N-acetyl-4-sulfonyl azidoaniline, 4-sulfonylazidoaniline, 4-azidoaniline, 4-azidophenacyl bromide, p-azidobenzoic acid, 2,6-bis(p-azidobenzylidene)cyclohexanone and 2,6-bis(p-azidobenzylidene)-4-methylcyclohexanone. Photoiniators, if used, are customarily used in amounts of from 0.01 to 5% by weight of the monomers to be polymerized.

Moreover there are crosslinkers which have at least two groups which are reactive toward acid groups. These crosslinkers may be added before, during or after the free-radical polymerization. The reaction can take place at room temperature or else at elevated temperatures of up to 200° C., depending on the reactivity of the crosslinker. It is consequently either a case of the subsequent crosslinking of polymers which were prepared by polymerization of the abovementioned monoethylenically unsaturated acids and optionally monoethylenically unsaturated comonomers and which have a molecular weight of greater than 5000, preferably greater than 50,000, or a case of crosslinking taking place concurrently with chain growth.

Suitable functional groups were already mentioned above, i.e., hydroxyl, amino, epoxy, isocyanate, ester, amido and aziridino groups. Examples of such crosslinkers are ethylene glycol, diethylene glycol, triethylene glycol, tetraethylene glycol, polyethylene glycol, glycerol, polyglycerol, propylene glycol, polypropylene glycol, block copolymers of ethylene oxide and propylene oxide, ethanolamine, sorbitan fatty acid esters, ethoxylated sorbitan fatty acid esters, trimethylolpropane, pentaerythritol, 1,3-butanediol, 1,4-butanediol, polyvinyl alcohol, sorbitol, polyglycidyl ethers such as ethylene glycol diglycidyl ether, polyethylene glycol diglycidyl ether, glycerol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether and polypropylene glycol diglycidyl ether, polyaziridine compounds such as 2,2-bishydroxymethylbutanol tris[3-(1-aziridinyl)propionate], 1,6-hexamethylenediethyleneurea, diphenylmethanebis-4,4'-N,N-diethyleneurea, halo epoxy compounds such as epichlorohydrin and α-methylepifluorohydrin, polyisocyanates such as 2,4-toluylene diisocyanate and hexamethylene diisocyanate, alkylene carbonates such as 1,3-dioxolan-2-one and 4-methyl-1,3-dioxolan-2-one, also bisoxazolines and oxazolidones, polyamidoamines and also their reaction products with epichlorohydrin, also polyquaternary amines such as condensation products of dimethylamine with epichlorohydrin, homo- and copolymers of diallyldimethylammonium chloride and also homo- and copolymers of dimethylaminoethyl (meth)acrylate which are optionally quaternized with, for example, methyl chloride.

Further suitable crosslinkers are polyvalent metal ions capable of forming ionic crosslinks. Examples of such crosslinkers are magnesium, calcium, barium and aluminum ions. These crosslinkers are added for example as hydroxides, carbonates or bicarbonates to the aqueous polymerizable solution.

Further suitable crosslinkers are multifunctional bases likewise capable of forming ionic crosslinks, for example polyamines or their quaternized salts. Examples of polyamines are ethylenediamine, diethylenetriamine, triethylenetetramine, tetraethylenepentamine, pentaethylenehexamine and polyethyleneimines and also polyvinylamines having molar masses of up to 4,000,000 in each case.

Crosslinkers are added to the acid polymers or salts in amounts of from 0.1 to 25% by weight, preferably from 0.1 to 15% by weight, based on the amount of polymer used.

Crosslinked polymers are preferably used in fully neutralized form. However, neutralization may also be partial. The degree of neutralization is preferably within the range from 25 to 100%, especially within the range from 50 to 100%. Useful neutralizing agents include alkali metal bases or ammonia/amines. Preference is given to the use of aqueous sodium hydroxide solution or aqueous potassium hydroxide solution. However, neutralization may also be effected using sodium carbonate, sodium bicarbonate, potassium carbonate or potassium bicarbonate or other carbonates or bicarbonates. Moreover primary, secondary and tertiary amines may be used.

Industrial processes useful for making these products include all processes which are customarily used to make superabsorbents, as described for example in Chapter 3 of "Modern Superabsorbent Polymer Technology", F. L. Buchholz and A. T. Graham, Wiley-VCH, 1998.

Polymerization in aqueous solution is preferably conducted as a gel polymerization. It involves 10–70% strength by weight aqueous solutions of the monomers and optionally of a suitable grafting base being polymerized in the presence of a free-radical initiator by utilizing the Trommsdorff-Norrish effect.

The polymerization reaction may be carried out at from 0 to 150° C., preferably at from 10 to 100° C., not only at atmospheric pressure but also at superatmospheric or reduced pressure. As is customary, the polymerization may also be conducted in a protective gas atmosphere, preferably under nitrogen.

By subsequently heating the polymer gels at from 50 to 130° C., preferably at from 70 to 100° C., for several hours, the performance characteristics of the polymers can be further improved.

Surface postcrosslinking may be carried out in a conventional manner using dried, ground and classified polymer particles.

To effect surface postcrosslinking, compounds capable of reacting with the functional groups of the polymers by crosslinking are applied tothe surface of the hydrogel particles, preferably in the form of an aqueous solution. The aqueous solution may contain water-miscible organic solvents. Suitable solvents are alcohols such as methanol, ethanol, i-propanol or acetone.

Suitable surface postcrosslinkers include for example:

di- or polyglycidyl compounds such as diglycidyl phosphonates or ethylene glycol diglycidyl ether, bischlorohydrin ethers of polyalkylene glycols, alkoxysilyl compounds, polyaziridines, aziridine compounds based on polyethers or substituted hydrocarbons, for example bis-N-aziridinomethane, polyamines or polyamidoamines and also their reaction products with epichlorohydrin, polyols such as ethylene glycol, 1,2-propanediol, 1,4-butanediol, glycerol, methyltriglycol, polyethylene glycols having an average molecular weight $M_w$ of 200–10,000, di- and polyglycerol, pentaerythritol, sorbitol, the ethoxylates of these polyols and their esters with carboxylic acids or carbonic acid such as ethylene carbonate or propylene carbonate, carbonic acid derivatives such as urea, thiourea, guanidine, dicyandiamide, 2-oxazolidinone and its derivatives, bisoxazoline, polyoxazolines, di- and polyisocyanates, di- and poly-N-methylol compounds such as, for example, methylenebis(N-methylolmethacrylamide) or melamine-formaldehyde resins, compounds having two or more blocked isocyanate groups such as, for example, trimethylhexamethylene diisocyanate blocked with 2,2,3,6-tetramethylpiperidin-4-one.

If necessary, acidic catalysts may be added, for example p-toluenesulfonic acid, phosphoric acid, boric acid or ammonium dihydrogenphosphate.

Particularly suitable surface postcrosslinkers are polyols such as 1,2-propanediol or 1,4-butanediol and carbonic acid derivatives such as ethylene carbonate or 2-oxazolidinone.

The crosslinker solution is preferably applied by spraying with a solution of the crosslinker in conventional reaction mixers or mixing and drying equipment. The spraying of the crosslinker solution may be followed by a heat treatment step, preferably in a downstream dryer, at from 80 to 230° C., preferably at from 120 to 210° C., particularly preferably at from 160 to 190° C., for from 5 minutes to 6 hours, preferably from 10 minutes to 2 hours, particularly preferably from 10 minutes to 1 hour, during which not only cracking products but also solvent fractions can be removed. But the drying may also take place in the mixer itself, by heating the jacket or by blowing in a preheated carrier gas.

The surface postcrosslinking heat treatment step provides hydrogel-forming polymers having a very low residual moisture content, typically of less than 1% by weight, frequently even of less than 0.5% by weight. It is believed that a low residual moisture content increases the brittleness of hydrogel-forming polymers, so that these products have only low mechanical stability.

According to the invention, increasing the residual moisture content to at least 3% by weight, preferably at least 4% by weight, more preferably to at least 5% by weight, increases the mechanical stability of these products considerably.

The use of surface postcrosslinkers of higher reactivity, for example ethylene glycol diglycidyl ether and its mixtures, makes it possible, through gentler temperatures, to terminate the reaction directly on obtaining a residual moisture content of at least 3% by weight.

The residual moisture content is preferably increased after the surface postcrosslinker has reacted completely, i.e., after the heat treatment step. The residual moisture content is preferably increased by spraying with water in cooling or mixing assemblies downstream of the dryer. Water is particularly preferably sprayed on in a cooler downstream of the surface postcrosslinking dryer, so that the cooling of the hot product and the increasing in the residual moisture can take place in one step. The temperature of the hydrogel-forming polymer at the instant of it being sprayed with water should be not more than 100° C., preferably not more than 80° C., particularly preferably not more than 60° C. Optionally it is also possible to use two or more successive colors, so that, for example, the hot product is initially cooled to below 100° C. in the first cooler and subsequently sprayed with water and further cooled down in the second cooler.

Hydrogel-forming polymer particles being sprayed with water tend to form undesirable agglomerations. In a preferred embodiment of the present invention, therefore, an aqueous surfactant solution or dispersion is sprayed on to increase the residual moisture content. All nonionic, anionic, cationic or amphoteric surfactants having an HLB value of not less than 3 (definition of HBL value: see W. C. Griffin, J. Soc. Cosmetic Chem. 5 (1954) 249) are suitable for this purpose.

Examples of suitable nonionic surfactants are the addition products of ethylene oxide, propylene oxide or mixtures of ethylene oxide and propylene oxide with alkylphenols, aliphatic alcohols, carboxylic acids and amines. $C_8$- to $C_{12}$-alkylphenols alkoxylated with ethylene oxide and/or propylene oxide are suitable, for example. Commercially available products of this kind are for example octylphenols and nonylphenols each reacted with from 4 to 20 mol of ethylene oxide per mole of phenol. Other nonionic surfactants are ethoxylated $C_{10}$- to $C_{24}$-fatty alcohols or ethoxylated $C_{10}$- to $C_{24}$-fatty acids and also ethoxylated $C_{10}$- to $C_{24}$-fatty amines or ethoxylated $C_{10}$- to $C_{24}$-fatty acid amides. Also suitable are polyhydric $C_3$- to $C_6$-alcohols partially esterified with partially $C_{10}$- to $C_{24}$-fatty acids. These esters may additionally be reacted with from 2 to 20 mol of ethylene oxide. Useful fatty alcohols for alkoxylation to prepare surfactants are for example palmityl alcohol, stearyl alcohol, myristyl alcohol, lauryl alcohol, oxo-alcohols and also unsaturated alcohols, such as oleyl alcohol. The fatty alcohols are ethoxylated or propoxylated to such a degree that the reaction products are soluble in water. In general, 1 mol of the abovementioned fatty alcohols is reacted with from 2 to 20 mol of ethylene oxide and optionally up to 5 mol of propylene oxide in such a way that the surfactants obtained have an HLB value of more than 8.

Examples of $C_3$- to $C_6$-alcohols which are partially esterified and optionally ethoxylated are, for example, glycerol, sorbitol, mannitol and pentaerythritol. These polyhydric alcohols are partially esterified with $C_{10}$- to $C_{24}$-fatty acid, for example oleic acid, stearic acid or palamitic acid. They are esterified with fatty acids only to such a degree that at least one OH group is left unesterified in the polyhydric alcohol. Suitable esterification products are for example sorbitan monooleate, sorbitan tristearate, mannitol monooleate, glycerol monooleate and glycerol dioleate. The aforementioned fatty acid esters of polyhydric alcohols which still contain at least one free OH group may be modified by additional reaction with ethylene oxide, propylene oxide or mixtures of ethylene oxide and propylene oxide. Preferably from 2 to 20 mol of the alkylene oxides mentioned are used per mole of fatty acid ester. The degree of ethoxylation is known to have an influence on the HLB value of nonionic surfactants. A suitable choice of type and amount of alkoxylating agent allows surfactants having HLB values within the range from 3 to 20 to be produced in a simple manner.

A further group of suitable substances are homopolymers of ethylene oxide, block copolymers of ethylene oxide and alkylene oxides, preferably propylene oxide, and also polyfunctional block copolymers, formed for example by sequential addition of propylene oxide and ethylene oxide to diamines.

Also suitable are alkylpolyglycosides, such as APG®, Glucopan® and Plantaren® from Henkel.

Nonionic surfactants can be used either alone or else mixed with each or one another.

Suitable anionic surfactants are $C_8$- to $C_{24}$-alkyl sulfonates, which are preferably used in the form of the alkali metal salts, $C_8$- to $C_{24}$-alkyl sulfates, which are preferably used in the form of the alkali metal or trialkanolammonium salts, e.g., triethanolammonium lauryl sulfates, sulfosuccinic diesters, for example the sodium salt of (2-ethylhexyl) sulfosuccinate, sulfosuccinic monoesters, for example sodium lauryl sulfocuccinate or disodium fatty alcohol polyglycol ether sulfosuccinate, $C_8$- to $C_{24}$-alkylarylsulfonic acids and also the acid sulfuric esters of addition products of ethylene oxide with alkylphenols or fatty alcohols.

Examples of suitable cationic surfactants are the salts of fatty amines, for example cocammonium acetate, quaternary fatty acid aminoesters, for example difatty acid isopropyl ester dimethylammonium methosulfate, quaternary fatty acid aminoamides, for example N-propylundecylenoamide N-trimethylammonium methosulfate, addition products of alkylene oxides with fatty amines or salts of fatty amines, for example pentaoxyethylstearylammonium acetate or ethoxylated methyl olein amine methosulfate and also long-chain alkylbenzyldimethylammonium compounds, such as $C_{10}$- to $C_{22}$-alkylbenzyldimethylammonium chloride.

Examples of suitable amphoteric surfactants are compounds which bear at least one quaternary ammonium cation and at least one carboxylate or sulfate anion in the same molecule, such as, for example, dimethylcarboxymethyl fatty acid alkylamidoammonium betaines or 3-(3-fatty acid amido propyl)dimethylammonium 2-hydroxypropanesulfonates.

Ionic surfactants may be used alone or else as a mixture with each or one another.

Surfactants are used in amounts of from 0.001 to 2.0%, preferably from 0.01 to 0.5%, by weight, based on hydrogel-forming polymer. Preference is given to the use of nonionic or anionic surfactants, particularly preferably nonionic surfactants, such as polyhydric ($C_3$–$C_6$)-alcohols partially esterified with ($C_{10}$–$C_{24}$)-fatty acids and reacted with 2–20 mol of ethylene oxide, or the aforementioned esterification products which have not been reacted with ethylene oxide.

In a further preferred embodiment of the present invention the water to be sprayed onto the hydrogel-forming polymer particles to increase their residual moisture content has added to it as plasticizing aid an ethanolamine of the general formula (I)

$$(HOCH_2CH_2)_xNR_{(3-x)} \quad (I),$$

where

R is hydrogen, methyl or $C_2$–$C_{20}$-alkyl, and

X is 1, 2 or 3.

The concentration of the ethanolamine of the formula I in the water is within the range from 0.001 to 20% by weight based on hydrogel-forming polymer, preferably within the range from 0.01 to 10% by weight, particularly preferably within the range from 0.5 to 5% by weight. A particularly preferred ethanolamine of the formula I is triethanolamine. If desired, a surfactant may be added to the aqueous ethanolamine solution in order that excessive agglomeration of hydrogel-forming polymer particles may be inhibited as the solution is being sprayed on. Surfactants suitable for this purpose were recited above.

The hydrogel-forming polymers of the invention possess improved mechanical stability which may be characterized in terms of the Frangibility Index. Thus the Frangibility Index of the hydrogel-forming polymers of the invention is at least 60%, preferably at least 70%, particularly at least 80%, most preferably at least 90%.

The hydrogel-forming polymers of the invention further possess a high absorption capacity under load. Thus AUL 0.7 psi (4826.5 Pa) is at least 20 g/g, but preferably at least 22 g/g, particularly preferably at least 24 g/g. The hydrogel-forming polymers of the invention additionally possess high permeability in the swollen state. Thus Saline Flow Conductivity is at least $40 \times 10^{-7}$ cm³s/g, preferably at least $50 \times 10^{-7}$ cm³s/g, especially at least $60 \times 10^{-7}$ cm³s/g, most preferably at least $80 \times 10^{-7}$ cm³s/g.

The present invention further provides hygiene articles comprising (A) a fluid-pervious topsheet (B) a fluid-impervious backsheet (C) a core positioned between (A) and (B) and comprising
  (C1) 10–100% by weight of the hydrogel-forming polymer of the invention.
  (C2) 0–90% by weight of hydrophilic fiber material (D) optionally a tissue layer positioned directly above and below said core (C) and (E) optionally an acquisition layer positioned between (A) and (C).

Hygiene articles for the purposes of the present invention include not only incontinence pads and incontinence briefs for adults but also diapers for infants.

The fluid-pervious topsheet (A) is the layer which is in direct contact with the skin of the wearer. Its material comprises customary synthetic and cellulosic fibers or films such as polyesters, polyolefins, rayon or natural fibers such as cotton. In the case of non-woven materials the fibers are generally joined together by binders such as polyacrylates. Preferred materials are polyesters, rayon and blends thereof, polyethylene and propylene.

The fluid-impervious layer (B) is generally a sheet of polyethylene or polypropylene.

The core (C) includes not only the hydrogel-forming polymer (C1) of the invention but also hydrophilic fiber material (C2). By hydrophilic is meant that aqueous fluids are rapidly distributed across the fiber. The fiber material is usually cellulose, modified cellulose, rayon, polyester such as polyethylene terephthalate. Particular preference is given to cellulose fibers such as pulp. Fibers generally have a diameter of 1–200 μm, preferably 10–10 μm. Fibers also have a minimum length of 1 mm.

The fraction of hydrophilic fiber material based on the total amount of the core is preferably 10–80% by weight, particularly preferably 40–70% by weight.

Diaper construction and shape is common knowledge and described for example in EP-A-0 316 518 and EP-A-0 202 127.

EXAMPLES

The Examples hereinbelow illustrate the invention.

Description of test methods:

CRC (Centrifuge Retention Capacity):

CRC is determined by weighing 0.2 g of hydrogel-forming polymer (particle size fraction 106–850 μm) into a teabag 60×85 mm in size, which is subsequently heat-sealed. The teabag is then placed in an excess of 0.9% by weight sodium chloride solution (at least 0.83 l saline solution/1 g of hydrogel-forming polymer). After a swell time of 30 minutes, the teabag is removed from the saline and centrifuged at a g force of 250 for three minutes. The centrifuged teabag is weighed to determine the amount of fluid retained by the hydrogel-forming polymer.

AUL 0.7 psi (4826.5 Pa)

The measuring cell for determining AUL 0.7 psi (4826.5 Pa) is a cylindrical Plexiglas tube 60 mm in internal diameter and 50 mm in height. Adhesively attached to its underside is a stainless steel sieve bottom having a mesh size of 36 μm. The measuring cell further includes a plastic plate having a diameter of 59 mm and a weight which can be placed in the measuring cell together with the plastic plate. The weight of the plastic plate and of the weight totals 1345 g. AUL 0.7 psi (4826.5 Pa) is determined by measuring the weight of the empty Plexiglass cylinder and of the plastic plate and recorded as $W_o$. 0.900±0.005 g of hydrogel-forming polymer (particle size distribution: 150–800 μm) is then weighed into the Plexiglass cylinder and distributed very uniformly over the stainless steel sieve. The Plexiglas plate is then carefully placed in the Plexiglas cylinder, the entire unit is weighed and the weight is recorded as $W_a$. The weight is then placed on the plastic plate in the Plexiglas cylinder. A ceramic filter plate 120 mm in diameter and 0 in porosity is then placed in the middle of a Petri dish 200 mm in diameter and 30 mm in height and sufficient 0.9% by weight sodium chloride solution is introduced for the surface of the liquid to be level with the filter plate surface without the surface of the filter plate being wetted. A round filter paper 90 mm in diameter and <20 μm in pore size (black ribbon 589 from Schleicher & Schüll) is subsequently placed on the ceramic filter plate. The Plexiglas cylinder containing hydrogel-forming polymer is then placed with plastic plate and weight on top of the filter paper and left there for 60 minutes. At the end of this period, the complete unit is removed from the filter paper and Petri dish and subsequently the weight is removed from the Plexiglas cylinder. The Plexiglas cylinder containing swollen hydrogel is weighed together with the plastic plate and the weight recorded as $W_b$. AUL 0.7 psi (4826.5 Pa) is calculated by the following equation:

$$\text{AUL } 0.7 \text{ psi} = [W_b - W_a]/[W_a - W_o]$$

SFC (Saline Flow Conductivity):

The test method for determining SFC is described in U.S. Pat. No. 5,599,335.

Frangibility Index:

The Frangibility Index is a measure to characterize the mechanical stability of hydrogel-forming polymer particles. The test is carried out by weighing 20 g of hydrogel-forming polymer (entire particle size spectrum) into a cylindrical porcelain mill having an internal diameter of 7.2 cm, an inner height of 8.8 cm and a capacity of about 360 mL. 127 g of porcelain media (dimensions: diameter 1.25 cm, height: 1.25 cm, weight: 5.3 g) are then added, the mill is sealed and rolled for 15 minutes at 150 rpm on appropriate rolls. Hydrogel-forming polymer SFC is determined before and after this treatment, so that the Frangibility Index can be calculated as follows:

Frangibility Index=$[SFC]_{after\ ball\ mill\ test} \times 100\%/[SFC]_{before\ ball\ mill\ test}$ Residual moisture content:

10.000 g±0.01 g of hydrogel-forming polymer are weighed into a tightly sealable dish having an internal diameter of 50–90 mm and an edge height of 20–30 mm and uniformly distributed, so that the hydrogel-forming polymer surface load on the dish is not more than 0.3 g/cm$^2$. The weight of the dish containing hydrogel-forming polymer and the weight of the lid for covering the dish are recorded as M1. The dish with the hydrogel-forming polymer and the lid are then placed separately in a drying oven preheated to 105° C.±20° C. and left therein for 3 hours. At the end of this period, the dish is sealed wit the lid and placed for 30 minutes in a desiccator to cool down to room temperature. The dish is then removed from the desiccator and weighed within 2 minutes, the weight being recorded as M2. The residue moisture content is then calculated according to the following equation:

Residual moisture content=$[(M1-M2)/(M1-M0)] \times 100\%$ where

M0=weight of empty dish and of lid; to determine, M0, dish and lid are dried at 105° C. in a drying cabinet and then cooled down to room temperature in a desiccator.

The determination is repeated at least once, and the residual moisture content which is reported is the arithmetic mean of the individual measurements.

Example 1 a) 6.9 kg of glacial acrylic acid are diluted with 23 kg of deionized water in a 40 l plastic bucket. 62 g of pentaerythritol triallyl ether are added with stirring, and the sealed bucket is inertized by passing nitrogen through it. The polymerization is then started by adding 0.4 g hydrogen peroxide, dissolved in 40 ml of deionized water, and 0.2 g of ascorbic acid, dissolved in 40 ml of deionized water. After the reaction has ended, the gel is mechanically comminuted and admixed with sufficient aqueous sodium hydroxide solution to obtain a degree of neutralization of 75 mol % based on the acrylic acid used. The neutralized gel is then dried on a drum dryer, pin-milled and finally classified with the fraction 200–850 μm being collected.

b) The base polymer prepared under a) was sprayed with 10.2% by weight of the base polymer of crosslinker solution composed of 49 parts by weight of methanol, 49 parts by weight of deionized water and 2 parts by weight of 2-oxazolidinone in a Lödige lab mixer. The moist product was subsequently transferred to a second preheated Lödige lab mixer and heat-treated at 195° C. for 60 minutes. The dried product was cooled down to room temperature and classified with the oversize point being 850 μm.

c) The surface-postcrosslinked polymer obtained according to b) was transferred to a third Lödige lab mixer after the heat-treatment step and cooled down to about 800° C. At about 75–80° C. the polymer was sprayed with 4% by weight of deionized water, based on polymer used, and further cooled down to room temperature. The unwanted coarse fractions ≧850 μm were removed by sieving and the Frangibility Index of the product was determined.

Example 2

Surface-crosslinked polymer as per Example 1 b) was transferred to a third Lödige lab mixer after the heat-treatment step and cooled down to about 600° C. At about 55–60° C. the polymer was sprayed with 6% by weight of deionized water based on polymer used and further cooled down to room temperature. The coarse fractions ≧850 μm were removed by sieving.

Example 3

Surface-modified polymer as per Example 1b was transferred to a third Lödige lab mixer after the heat-treatment step and cooled down to about 60° C. At about 55–60° C. the polymer was sprayed with 5.15% by weight based on polymer used of a solution of 96.4 parts by weight of deionized water and 3.6 parts by weight of sorbitan monococoate and further cooled down to room temperature. The coarse fractions ≧850 μm were removed by sieving.

Example 4

Surface-modified polymer as per Example 1b was transferred to a third Lödige lab mixer after the heat-treatment step and cooled down to about 60° C. At about 55–60° C. the polymer was sprayed with 6.65% by weight based on polymer used of a solution of 60.1 parts by weight of deionized water, 37.6 parts by weight of triethanolamine and 2.3 parts by weight of sorbitan monococoate and further cooled down to room temperature. The coarse fractions ≧850 μm were removed by sieving.

TABLE 1

Application data of polymers prior to mechanical test in ball mill

| Example | Residual moisture content [% by wt.] | SFC [$10^{-7}$ cm$^3$s/g] | AUL 0.7 psi [g/g] | CRC [g/g] |
|---|---|---|---|---|
| Example 1a | 4.3 | — | 12.0 | 35.0 |
| Example 1b | 0.3 | 71 | 25.8 | 25.9 |
| Example 1c | 3.3 | 77 | 25.0 | 25.2 |
| Example 2 | 5.2 | 86 | 23.6 | 24.3 |
| Example 3 | 4.4 | 84 | 24.0 | 25.2 |
| Example 4 | 3.4 | 85 | 22.8 | 24.9 |

TABLE 2

Application data of polymers after mechanical test in ball mill (see Frangibility Index test)

| Example | Frangibility Index [%] | SFC [$10^{-7}$ cm$^3$s/g] | AAP 0.7 psi [g/g] | CRC [g/g] | Fraction >850 μm [% by wt.] |
|---|---|---|---|---|---|
| Example 1b | 39.4 | 28 | 21.9 | 25.5 | — |
| Example 1c | 63.6 | 49 | 23.5 | 25.0 | 14.7 |
| Example 2 | 77.9 | 67 | 23.4 | 24.1 | 21.5 |

TABLE 2-continued

Application data of polymers after mechanical test in ball mill (see Frangibility Index test)

| Example | Frangibility Index [%] | SFC [$10^{-7}$ cm$^3$s/g] | AAP 0.7 psi [g/g] | CRC [g/g] | Fraction >850 μm [% by wt.] |
|---|---|---|---|---|---|
| Example 3 | 82.1 | 69 | 23.7 | 25.1 | 3.1 |
| Example 4 | 91.8 | 78 | 22.5 | 24.9 | 5.3 |

The inventive polymers of Examples 1c, 2, 3 and 4 have a significantly higher Frangibility Index than the noninventive polymer of Example 1b.

We claim:

1. Hydrogel-forming polymer having
   (i) a Saline Flow Conductivity (SFC) of at least $40 \times 10^{-7}$ cm$^3$s/g
   (ii) an AUL 0.7 psi (4826.5 Pa) of at least 20 g/g
   (iii) a Frangibility Index of at least 60%.

2. Hydrogel-forming polymer as claimed in claim 1, possessing a Saline Flow Conductivity (SFC) of at least $50 \times 10^{-7}$ cm$^3$s/g.

3. Hydrogel-forming polymer as claimed in claim 1 or 2, possessing an AUL 0.7 psi (4826.5 Pa) of at least 22 g/g.

4. The hydrogel-forming polymer of claim 1, which has a Frangibility Index of at least 70%.

5. The hydrogel-forming polymer of claim 2, which has a Frangibility Index of at least 70%.

6. The hydrogel-forming polymer of claim 3, which has a Frangibility Index of at least 70%.

7. A process for producing a hydrogel-forming polymer having:
   (i) a Saline Flow Conductivity of at least $40 \times 10^{-7}$ cm$^3$s/g;
   (ii) an AUL 0.7 psi (4826.5 Pa) of at least 20 g/g; and
   (iii) a Frangibility Index of at least 60%;
wherein said process comprises:
   (a) subjecting a polymer to a surface postcrosslinking step, to obtain a surface-postcrosslinked polymer; and
   (b) treating said surface-postcrosslinked polymer, to obtain a residual moisture content of at least 3% by weight.

8. The process of claim 7, wherein said hydrogel-forming polymer has a Saline Flow Conductivity of at least $50 \times 10^{-7}$ cm$^3$s/g.

9. The process of claim 7, wherein said hydrogel-forming polymer has an AUL 0.7 psi (4826.5 Pa) of at least 22 g/g.

10. The process of claim 7, wherein said hydrogel-forming polymer has a Frangibility Index of at least 70%.

11. The process of claim 7, wherein said treating said surface-postcrosslinked polymer, to obtain a residual moisture content of at least 3% by weight, comprises adding water to said surface-postcrosslinked polymer.

12. The process of claim 11, wherein water is added to said surface-postcrosslinked polymer in a cooler downstream of a surface postcrosslinking dryer.

13. The process of claim 11, wherein said hydrogel-forming polymer has a Saline Flow Conductivity of at least $50 \times 10^{-7}$ cm$^3$s/g.

14. The process of claim 11, wherein said hydrogel-forming polymer has an AUL 0.7 psi (4826.5 Pa) of at least 22 g/g.

15. The process of claim 11, wherein said hydrogel-forming polymer has a Frangibility Index of at least 70%.

16. The process of claim 11, wherein said water comprises a surfactant having an HLB value $\geq 3$.

17. The process of claim 11, wherein said water comprises an ethanolamine of the general formula (I)

$$(HOCH_2CH_2)_x NR_{(3-x)} \quad (I),$$

wherein
   R is hydrogen, methyl, or $C_2$–$C_{20}$-alkyl, and
   x is 1, 2 or 3,
as a plasticizing aid.

18. A hygiene article comprising
   (A) a fluid-pervious topsheet
   (B) a fluid-impervious backsheet
   (C) a core positioned between (A) and (B) and comprising
      (C1) 10–100% by weight of a hydrogel-forming polymer; and
      (C2) 0–90% by weight of hydrophilic fiber material;
wherein said hydrogel-forming polymer has:
   (i) a Saline Flow Conductivity (SFC) of at least $40 \times 10^{-7}$ cm$^3$s/g;
   (ii) an AUL 0.7 psi (4826.5 Pa) of at least 20 g/g; and
   (iii) a Frangibility Index of at least 60%.

19. The hygiene article of claim 18, wherein said hydrogel-forming polymer has a Saline Flow Conductivity of at least $50 \times 10^{-7}$ cm$^3$s/g.

20. The hygiene article of claim 18, wherein said hydrogel-forming polymer has an AUL 0.7 psi (4826.5 Pa) of at least 22 g/g.

21. The hygiene article of claim 18, wherein said hydrogel-forming polymer has a Frangibility Index of at least 70%.

22. The hygiene article of claim 18, further comprising:
   (D) a tissue layer positioned directly above and below said core (C).

23. The hygiene article of claim 22, wherein said hydrogel-forming polymer has a Saline Flow Conductivity of at least $50 \times 10^{-7}$ cm$^3$s/g.

24. The hygiene article of claim 22, wherein said hydrogel-forming polymer has an AUL 0.7 psi (4826.5 Pa) of at least 22 g/g.

25. The hygiene article of claim 22, wherein said hydrogel-forming polymer has a Frangibility Index of at least 70%.

26. The hygiene article of claim 18, further comprising:
   (E) optionally an acquisition layer positioned between (A) and (C).

27. The hygiene article of claim 26, wherein said hydrogel-forming polymer has a Saline Flow Conductivity of at least $50 \times 10^{-7}$ cm$^3$s/g.

28. The hygiene article of claim 26, wherein said hydrogel-forming polymer has an AUL 0.7 psi (4826.5 Pa) of at least 22 g/g.

29. The hygiene article of claim 26, wherein said hydrogel-forming polymer has a Frangibility Index of at least 70%.

* * * * *